United States Patent [19]

Pickett

[11] 4,179,048

[45] Dec. 18, 1979

[54] SEED SPREADER

[76] Inventor: Carl M. Pickett, 12 Robin Rd., Farmington, Conn. 06032

[21] Appl. No.: 882,330

[22] Filed: Mar. 1, 1978

[51] Int. Cl.² .............................................. A01C 7/02
[52] U.S. Cl. ...................................... 222/44; 222/48; 222/242; 222/311; 222/555
[58] Field of Search ............... 222/227, 239, 242, 311, 222/555, 42, 44, 48; 221/201, 202, 203, 265

[56] References Cited

U.S. PATENT DOCUMENTS

| | | | |
|---|---|---|---|
| 332,955 | 12/1885 | Simnil | 222/410 |
| 875,948 | 1/1908 | Racouillat et al. | 222/239 |
| 1,296,540 | 3/1919 | Long | 222/311 |
| 1,944,447 | 1/1934 | McVicker | 222/239 |
| 2,399,016 | 4/1946 | Gits | 222/153 |
| 2,520,163 | 8/1950 | Mount | 222/242 |
| 2,750,072 | 6/1956 | Duncan | 222/42 |
| 3,141,581 | 7/1964 | Emmons et al. | 222/283 |

Primary Examiner—Allen N. Knowles

[57] ABSTRACT

A hand held seed dispenser has a generally cylindrical shaped receptacle portion having a bottom wall in which is formed an outlet opening. An agitator blade is mounted within the receptacle and connected to a closure plate which is pivotably mounted below the bottom wall and has a dispenser opening in it. Pivoting oscillation of the closure plate simultaneously moves the agitator blade and the dispenser hole past the outlet opening to discharge seeds or the like from the dispenser. A selector plate having differently sized holes in it is independently pivotably mounted between the bottom wall and closure plate to align a selected control opening with the outlet opening to accommodate different sizes of seeds or the like.

19 Claims, 17 Drawing Figures

U.S. Patent Dec. 18, 1979 Sheet 1 of 4 4,179,048
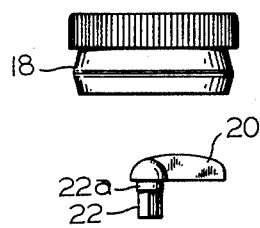
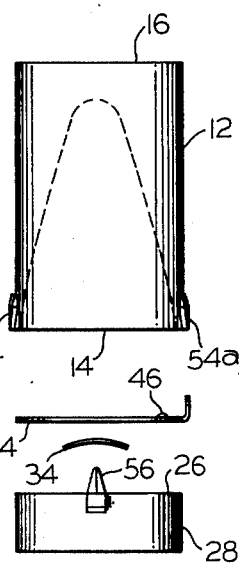
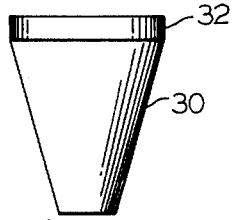
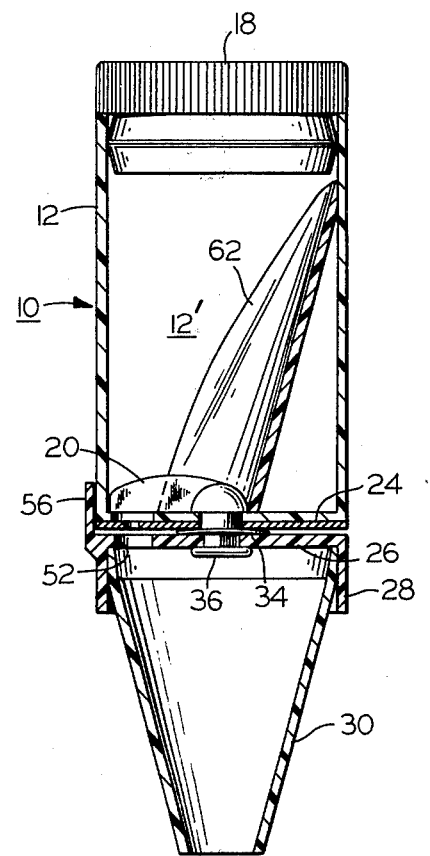
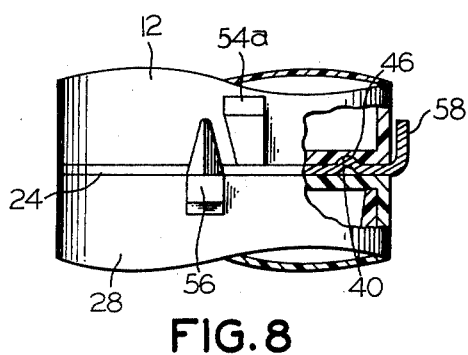
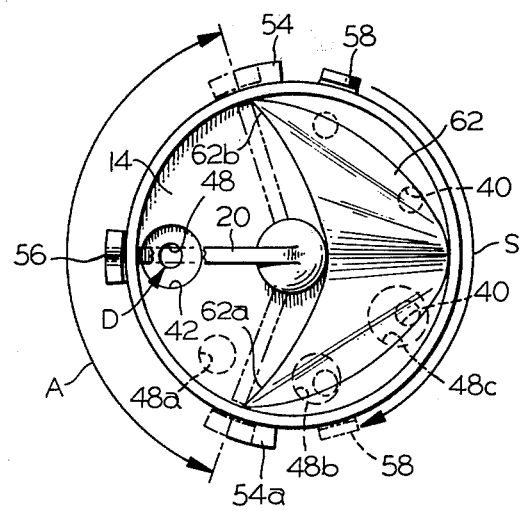
FIG.1
FIG.2
FIG.8
FIG.6

SEED SPREADER

BACKGROUND OF THE INVENTION

The present invention relates to a dispenser for seeds or the like and, in particular, to such a dispenser which is hand held.

Devices for dispensing seeds or the like for planting are known in the art. U.S. Pat. No. 332,955 discloses a corn planter and guano distributor which includes a manually operated stirrer or agitator and has a lateral slide operative to selectively close a portion of the delivery tube to regulate the amount of feed.

Another prior art device is illustrated by U.S. Pat. No. 1,296,540 which discloses a planter having a rotary agitator blade and including a seed plate having a plurality of spaced openings of different sizes which is movable across the opening to accommodate proper sowing of seeds of different type.

U.S. Pat. No. 2,520,163 discloses a rotary type of planter having a rotatable outer cap having blades formed therein so that rotation of the cap agitates the seeds or other objects. An outer cap having a single opening in it which registers with the openings in the rotated cap is provided and may be aligned with one of several openings in the rotatable cap to enable discharge from one of the other openings when discharge ceases from another opening.

Generally, prior art dispensers for seeds or the like suffer from one or more shortcomings. For example, prior art seed dispensers do not provide a positive control for dispensing of the seed but rather rely upon a more or less continuous discharge of the seed through an opening by means of rotation of an agitator blade. Some prior art devices are rather complicated requiring gears and the like to control the action of the agitator blade.

It is accordingly an object of the present invention to provide a hand held dispenser for seeds or the like which overcomes the foregoing and other shortcomings of prior art devices by providing a novel hand held dispenser for seeds or the like which provides positive control over the timing of discharge of the seeds or the like.

It is another object of the present invention to provide a novel design of seed dispenser in which the size of the discharge opening may be selected to accommodate different sizes and types of seeds or the like.

It is another object of the present invention to provide a seed dispenser of novel design which is rugged and simple in design and construction. Other objects and advantages of the invention will appear more fully from the following description.

SUMMARY OF THE INVENTION

In accordance with the present invention there is provided a hand held dispenser for seeds or the like which comprises a receptacle adapted to contain seeds or the like therein, and having a bottom wall. A selector plate is disposed in close proximity to the bottom wall and has one of an outlet opening and a plurality of spaced apart, differently configured control openings formed therein, the other of the outlet and control openings being formed in the bottom wall. A selector mounting means mounts the selector plate to extend along and be movable relative to the bottom wall to permit selective alignment of any one of the control openings with the outlet opening to provide a discharge opening extending from within the receptacle to exteriorly thereof. An agitator blade is within the receptacle and blade mounting means mount the agitator blade for periodic movement within the receptacle adjacent the bottom wall. A closure plate has a dispenser opening therein and extends exteriorly of the bottom wall to close the discharge opening. Closure mounting means mounts the closure plate to be movable relative to the discharge opening to permit selective movement of the closure plate dispenser opening into and out of register with the discharge opening for intermittent opening and closing thereof, whereby to cooperate with movement of the agitator blade for intermittent discharge of seeds or the like from the receptacle through the discharge opening.

Certain objects of the invention are attained when the outlet opening is formed in the bottom wall and the control openings are formed in the selector plate. The said blade mounting means and the closure mounting means may comprise connector means, such as a shaft extending through the bottom wall, interconnecting the agitator blade and the closure plate whereby movement of the closure plate simultaneously moves the agitator blade and vice versa.

Other objects of the invention are attained when the blade and the dispenser opening are radially aligned with each other relative to the shaft whereby the blade is moved into and out of register with the discharge opening simultaneously with the dispenser opening. The selector plate is preferably mounted exteriorly of the receptacle.

Certain objects of the invention are attained when the dispenser further includes trigger means thereon which are accessible externally of the dispenser and operatively connected to the agitator blade for movement of the closure plate and agitator blade relative to the receptacle by operation of the trigger means. A pistol grip handle may also be provided extending outwardly of the receptacle, with the trigger means disposed adjacent to the pistol grip. The trigger means is operatively connected to the agitator blade for simultaneous movement of the closure plate and agitator blade relative to the receptacle by operation of the trigger means.

In accordance with one aspect of the invention, the receptacle is generally cylindrical in shape and the selector plate and closure plate are generally disc-shaped. Generally, in accordance with one aspect of the invention, movement of the blade and closure plate is affected by pivoting movement about the shaft; the receptacle may have a closeable fill opening therein adapted for placing seeds or the like into the receptacle. Further, interior wall means may be provided within the receptacle sloping towards the outlet opening to direct seeds or the like therethrough.

BRIEF DESCRIPTION OF THE DRAWINGS

FIG. 1 is an exploded front elevation of one embodiment of a seed dispenser in accordance with the present invention;

FIG. 2 is a cross-sectional view in front elevation of the assembled device of FIG. 1;

FIG. 6 is a top plan view of the assembled device of FIG. 2, with the top cover removed;

FIG. 8 is a partial front elevation view with parts broken away of the assembled device of FIG. 1;

DESCRIPTION OF THE PREFERRED EMBODIMENT

Figure 3:
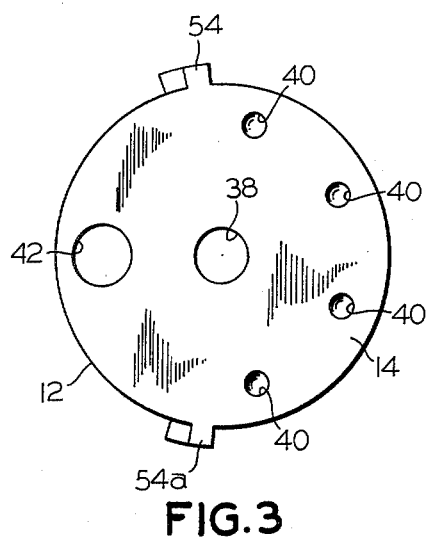
FIG. 3 is a bottom plan view of the exterior of the bottom wall of the device of FIG. 1, taken along the line 3—3 thereof.

Referring jointly to FIGS. 1 and 2, there is generally indicated at 10 one embodiment of a hand held dispenser for seed or the like in accordance with the present invention. FIG. 1 is an exploded view. The dispenser includes a main body portion comprising a receptacle 12 adapted to contain seeds or the like therein. Receptacle 12 has a bottom wall 14 which, as shown in FIG. 3, is generally disc shaped comprising as it does the bottom wall of receptacle 12, which is generally cylindrical in shape. The upper end of receptacle 12 is open to provide a fill opening 16 at the top of receptacle 12 which is closeable by a cap 18 adapted to cap receptacle 12 as shown in FIG. 2. An agitator blade 20 is connected to one end of a shaft 22 and is adapted to be mounted within receptacle 12 for periodic pivoting movement therein adjacent bottom wall 14 as described more fully below.

Figure 4:
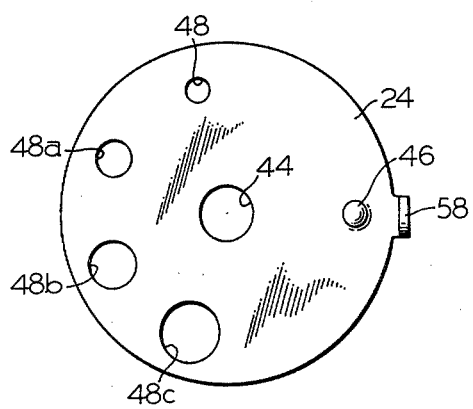
FIG. 4 is a top plan view of the selector plate component of the device of FIG. 1 taken along line 4—4 thereof.

A selector plate 24 is mounted beneath receptacle 12 to extend along and be movable relative to bottom wall 14. As best seen in FIG. 4, selector plate 24 is also generally disc shaped and of substantially the same diameter as bottom wall 14.

Figure 5:
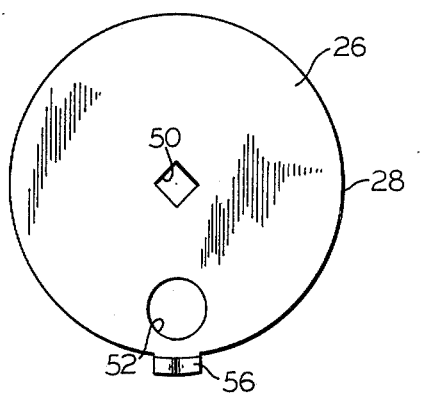
FIG. 5 is a top plan view of the closure plate portion of the device of FIG. 1 taken along line 5—5 thereof.

A closure plate 26 has, as best seen in FIG. 5, generally disc-shaped configurations substantially the same in diameter as bottom wall 14 and selector 24, and further has a cylindrical shaped circumferential flange thereon adapted to serve as a gripping rim 28. In the embodiment shown, closure plate 26 has its gripping rim 28 integrally formed therewith.

A generally truncated cone shaped dispenser guide 30 which, as best seen in FIG. 2, is hollow and has its larger diameter or base end disposed adjacent to the underside of closure plate 26. Dispenser guide 30 has a cylindrical shaped mounting rim 32 extending circumferentially about its base to facilitate affixing dispenser guide 30 to the underside of closure plate 26 as best seen in FIG. 2.

A lock washer 34 is mounted over shaft 22 and affixed in place thereon by a fastening element comprising a washer nut 36 (FIG. 2).

Referring to FIG. 3, bottom wall 14 of receptacle 12 has a central opening 38 formed therein which is adapted to receive shaft 22 therethrough. Radially spaced from central opening 38 are a plurality of second detent means provided by a plurality of recesses 40 stamped into bottom wall 14 and adapted to cooperate with first detent means provided on selector plate 24 as described below. Recesses 40, which are circular plan view and dome shaped, are circumferentially spaced apart along bottom wall 14 and radially inwardly adjacent the periphery thereof. An outlet opening 40 is formed in bottom wall 14 radially spaced from central opening 38 and adjacent a peripheral portion of bottom wall 14 generally opposite that on which recesses 40 are formed. Outlet opening 42 extends entirely through bottom wall 14.

As shown in FIG. 4, selector plate 24 has a central opening 44 designed to align with central opening 38 of bottom wall 14 to admit shaft 22 therethrough. Central opening 38, 44 are sized with respect to shaft 22 so that shaft 22 may rotate independently of wall 14, plate 24. First detent means comprising a raised dome shaped dimple or boss 46 is formed on selector plate 24 radially spaced from the center thereof so as to align with any one of recesses 40. A plurality of spaced apart differently sized control openings 48, 48a, 48b and 48c are formed in selector plate 24 radially spaced from central opening 44 and circumferentially spaced apart inwardly adjacent the peripheral edge of selector plate 24. Each of control openings 48, 48a, 48b and 48c may, as described below, by pivoting of selector plate 24 be brought into register with outlet opening 42.

Closure plate 26, as best seen in FIG. 5, has a square central opening 50 formed therein which is adapted to be engaged by shaft 22. Shaft 22 is also of square cross section so that rotation of closure plate 26 will rotate shaft 22 therewith. Radially spaced from central opening 50 is a dispenser opening 52 formed inwardly adjacent the circumferential edge of selector plate 26 at a position so that pivoting movement of closure plate 26 will periodically move dispenser opening 52 into and out of register with outlet opening 42 and the control opening aligned with it.

As best seen in FIGS. 1 and 2, shaft 22 has a round cross section portion 22a which is dimensioned and configured to snugly but rotatably fit within each of central openings 38 and 44 when selector plate 24 is mounted adjacent and extending along the exterior of bottom wall 14. Closure plate 26 is then placed extending along and in contact with the outer portion of selector plate 24 and the assembly held together by means of lock washer 34 and washer nut 36, all as best seen in FIG. 2. By suitably tightening washer nut 36, which may be accomplished by providing a threaded end (not shown) to the lowermost portion of shaft 22, receptacle 12 and closure plate 26 are held together for relative pivoting movement which may be effectuated manually by holding receptacle 12 in one hand and pivoting closure plate 26 relative to it by taking gripping rim 28 between the thumb and forefinger and twisting it back and forth relative to receptacle 12.

In order to limit such pivoting movement a pair of stops 54, 54a (FIGS. 1 and 6) are provided circumferentially apart on receptacle 12 adjacent bottom wall 14 thereof. A dog 56 is provided on gripping rim 28 circumferentially adjacent dispenser opening 52 thereof and may best be seen in FIG. 7. In this manner, when dog 56 is centered between stops 54 and 54a, dispenser opening 52 will be registered with outlet opening 42 and the control opening 48, 48a, etc. associated therewith.

Figure 9:
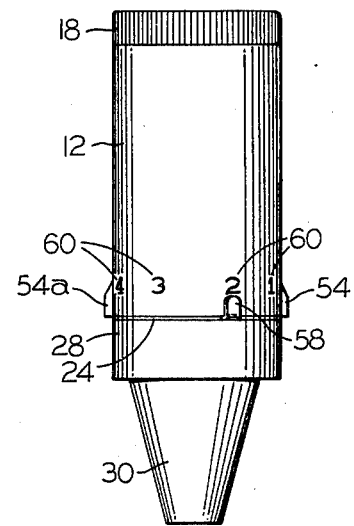
FIG. 9 is a rear elevation view of the assembled device of FIG. 1.

Referring to FIGS. 4 and 6, selector plate 24 includes a handle means comprising a pointer 58 which extends generally radially outwardly of selector plate 24 and is bent upwardly to extend upwardly a short distance generally parallel to the axis of rotation of shaft 22. Pointer 58 is circumferentially positioned on selector plate 24 and serves the dual function of a handle means by which selector plate 24 may be pivoted about shaft 22 independently thereof and a pointer which cooperates with indicia 60 to indicate the relative pivotable position of selector plate 24 relative to receptacle 12. In the embodiment illustrated, as shown in FIG. 9, indicia 60 comprise the numbers 1, 2, 3 and 4 which are positioned about the lower circumference of receptacle 12 so that, when pointer 58 is adjacent the numeral 1, the smallest control opening 48 is aligned with outlet opening 42 in bottom wall 14. As selector 24 is rotated, when handle 58 is adjacent to the numeral 2, control opening 48a is aligned with outlet opening 42 and so on. Recesses 40 formed in the exterior portion of bottom wall 14 and raised boss 46 formed in the upper surface of selector plate 24 are dimensioned and configured and located relative to each other to releasably engage each other when respective ones of control openings 48, 48a, etc. are aligned with outlet openings 42. Thus, as viewed in FIG. 3, when the uppermost recess 40 engages bosses 46, control opening 48 is aligned with outlet opening 42, and so on. The alignment of any one of 48, 48a, etc. with outlet opening 42 brings the two openings into register to cooperate to comprise a discharge opening leading from the interior 12' of receptacle 12 to exteriorly thereof. As shown in FIG. 6, pointer 58 may selectively be moved to releasably engage boss 46 with any one of the recesses 40 and thereby provide a discharge opening of selected size depending upon which of control openings 48, 48a, 48b or 48c is selectively brought into register with outlet opening 42 to provide a discharge opening. While the various control openings 48, 48a, etc. are each shown as being circular but of different size, obviously, any one or more of them could have different shapes such as oval instead of circular, and any one or more of them may comprise two or more holes instead of a single hole configured and dimensioned to be brought into register with outlet opening 42. Obviously, outlet opening 42 has an area large enough to accommodate the largest of the individual control openings 48, 48a, etc. The path of movement of pointer 58 is indicated by the arrow S in FIG. 6. The discharge opening D is provided by the cooperation of outlet opening 42 and control opening 48 in the illustrated relative position of selector plate 24.

Figure 7:
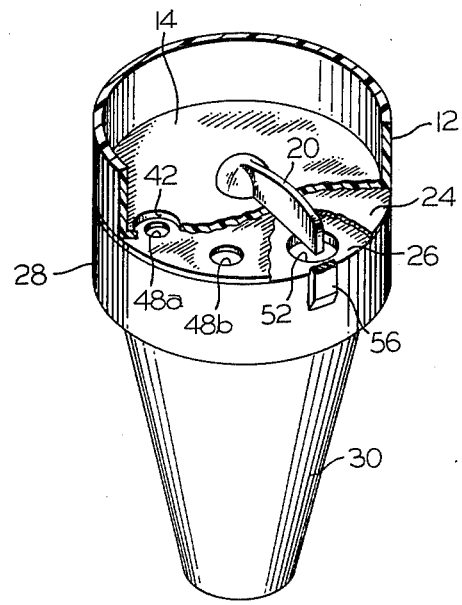
FIG. 7 is a perspective view with parts broken away of the lower body portion and bottom wall of the device of FIG. 1.

Shaft 22 is rotationally oriented relative to closure plate 26 so that agitator blade 20 is radially aligned with dispenser opening 52 in closure plate 26 as may be seen with reference to FIG. 7. Since closure plate 26 rotates with agitator blade 20, both pass simultaneously into and out of register with discharge opening D. This causes agitator blade 20 to move a seed or the like being discharged over discharge opening D as it is opened by passage of dispenser opening 52 into alignment with it.

A baffle provides interior wall means 62 which slope inwardly downwardly towards bottom wall 14 within the interior 12' of receptacle 12 to direct seeds or the like to the discharge opening D provided by alignment of outlet opening 42 with any one of control openings 48, 48a, etc. As best seen in FIG. 6, interior wall means 62 is shaped and configured so that opposite bottom edges 62a and b thereof are disposed circumferentially adjacent stops 54, 54a to allow clearance for pivoting movement of agitator blade 20 along a circumferential path, the limits of which are indicated by the arrow A in FIG. 6. Limit positions of blade 20 are shown in dotted lines in FIG. 6.

By use of gripping rim 28, closure plate 26 may be positioned out of register with discharge opening D as may be readily determined by the operator by simply rotating gripping rim 28 so that dog 56 is disposed adjacent either one of stops 54, 54a. Cap 18 may then be removed and interior 12' of receptacle 12 may be partly or completely filled with seeds or the like to be dispensed. Cap 18 is then replaced and selector plate 24 pivoted to the appropriate position to align a selected one of the control openings 48, 48a, etc. with outlet opening 42, depending upon the size of the seed or the like to be dispensed. After setting selector plate 24, by rotating dog 56 past the midpoint between stops 54 and 54a a seed or seeds may be dispensed since such rotation will bring dispenser opening 52 into register with discharge opening D. Agitator blade 20 will simultaneously pass over discharge opening D to insure positive displacement of a seed or seeds through the discharge opening.

Figure 10:
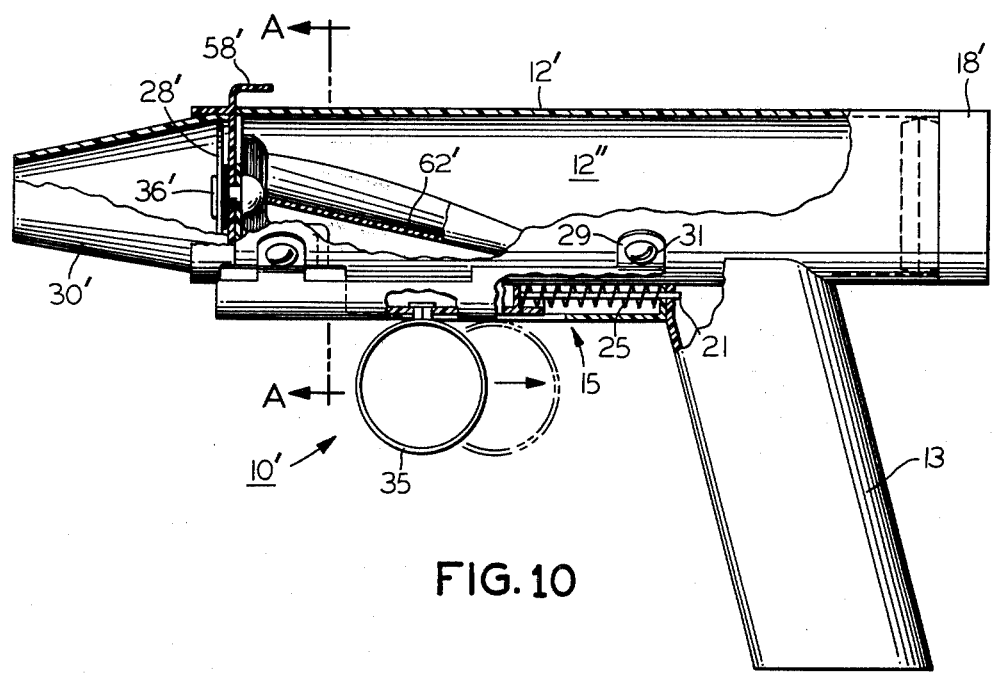
FIG. 10 is a side elevation view with parts broken away of a second embodiment of a seed dispenser in accordance with the invention.

Referring now to FIG. 10, there is shown a second embodiment of the present invention in which the dispenser is generally indicated at 10' and includes a main body portion comprising a receptacle 12' having an interior 12" adapted to contain seeds or the like therein. An interior wall 62' is provided to guide the seeds.

A pistol grip 13 is affixed to the outer wall of the receptacle 12' and extends generally transversely outwardly therefrom. The end of receptacle 12' adjacent which pistol grip handle 13 is affixed, is closed by a closure cap 18 which is removable to permit the placement of seeds or the like within interior 12" of receptacle 12'. The opposite end of receptacle 12' has a dispenser guide 30' thereon which serves to guide seeds dispensed from dispenser 10'. Dispenser 30' has the shape of a hollow truncated cone.

That end of receptacle 12 to which dispenser guide 30 is attached is closed by a bottom wall 14' which is substantially similar in construction to bottom wall 14 of the FIG. 1 embodiment. Generally, those parts of the FIG. 10 embodiment which are substantially the same as those of the FIG. 1 embodiment are identically numbered thereto but with a prime (') designator added. The description of such substantially identical parts is not repeated in detail.

Figure 13:
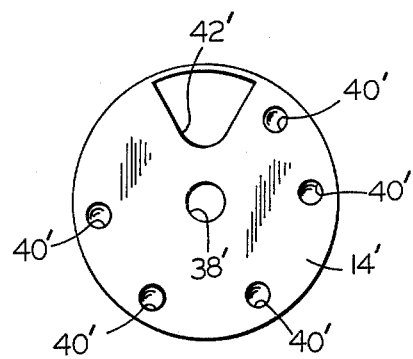
FIG. 13 is a bottom plan view of the exterior of the bottom wall of the device of FIG. 10.
Figure 15:
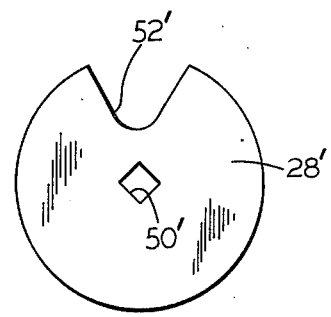
FIG. 15 is a top plan view of the closure plate portion of the device of FIG. 10.
Figure 14:
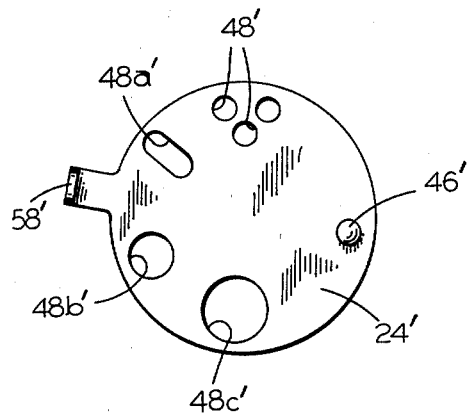
FIG. 14 is a top plan view of the selector plate component of the device of FIG. 10.

Generally, FIGS. 13, 14 and 15 correspond, respectively, to FIGS. 3, 4 and 5 and respectively illustrate in plan view bottom wall 14', selector plate 24', and closure plate 28' of the embodiment of FIG. 10. Referring to FIG. 13, bottom wall 14' has a plurality of recesses 40' stamped therein which comprise second detent means adapted to cooperate with first detent means (boss 46') on selector plate 24' (FIG. 14) to retain selector plate 24' is a selected rotational position relative to bottom wall 14'. This will either align a selected one of the central openings 48', 48a', etc. with outlet opening 42', or close outlet opening 42' with selector plate 24'.

Figure 10A:
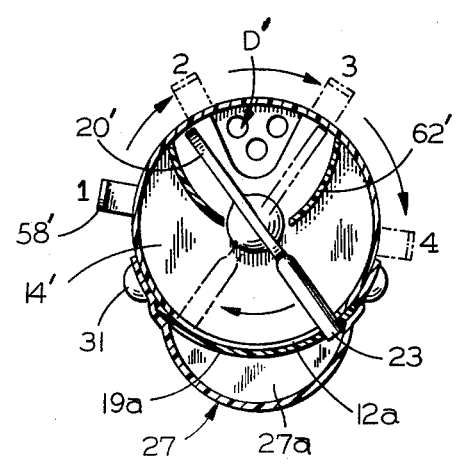
FIG. 10A is a cross sectional view taken along line A—A of FIG. 10.

Selector plate 24' is seen to be of similar construction to that of selector plate 24 shown in FIG. 4, except that in this case the several control openings 48', 48a', 48b' and 48c' are shaped differently as well as being sized differently from each other. Thus, control opening 48' comprises a plurality of small, substantially circular openings. Control opening 48b' is a single elongated slot, and control openings 48b' and 48c' are, respectively, single circular shaped openings of different sizes. Further, in this embodiment, selector plate 24' is affixed to dispenser guide 30' for movement therewith. Selector plate 24' has a combination handle means/pointer 58' which may be employed to selectively rotate selector plate 24' (and dispenser 30') relative to the generally cylindrically shaped receptacle 12'. Handle means/pointer 58' is adapted to cooperate with indicia 60' indicate which of the several control openings is aligned with outlet opening 42', in a manner similar to that described in detail with respect to the FIG. 1 embodiment, to provide a discharge opening D' (FIG. 10A).

Referring to FIG. 15, closure plate 28' has a generally wedge-shaped dispenser opening 52' and a square central opening 50' which serves to mount closure plate 28' non-rotatively upon shaft 22' for rotation or pivoting therewith, independently of dispenser guide 30' and selector plate 24'.

Figure 12:
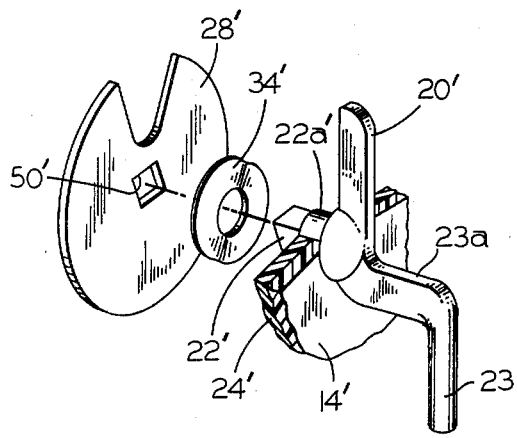
FIG. 12 is an exploded perspective view of the agitator blade, washer and closure plate components of the embodiment of FIG. 10.

Referring now to FIG. 12, agitator blade 20' extends radially outwardly from one end of a square cross section shaft 22' which has a round cross section portion 22a'. The square cross section portion of shaft 22' is adapted to drivingly engage closure plate 28', so that rotation or pivoting oscillation of shaft 22' rotates closure plate 28' therewith. Round cross section portion 22a' is dimensioned and configured to snugly but rotatably fit within each of the central openings 38' and 44'. An enlarged diameter (relative to 22a') hub portion (unnumbered) of shaft 22' provides a shoulder for seating one end of shaft 22'. A washer nut 36' (FIG. 10) is affixed to the other end of shaft 22'. A lock washer 34' is interposed between closure plate 28' and selector plate 24'. Lock washer 34' is normally of dished resilient construction of a belleville spring so that on flattening thereof as shown in FIG. 10 it exerts an expansion force to snugly seat selector plate 24' and closure plate 28' against the opposite ends of shaft 22.

Shaft 22' has a pivot arm 23 extending radially outwardly therefrom in the opposite radial direction from agitator blade 20'. Pivot arm 23 is connected to a link portion 23a which extends axially parallel to shaft 22' so that pivot arm 23 is axially offset from agitator blade 20'.

Figure 11:
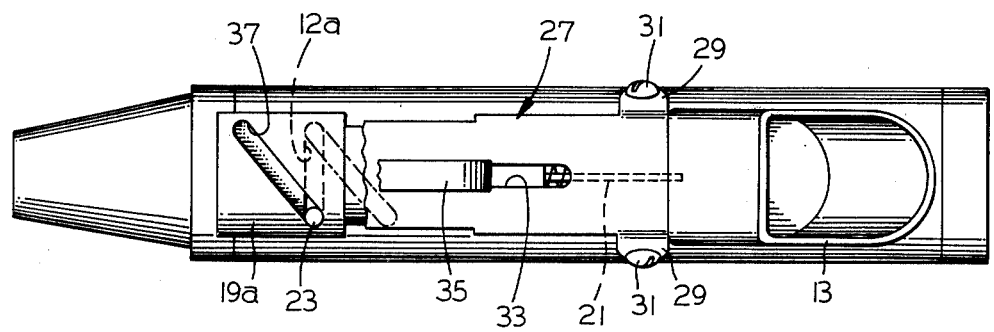
FIG. 11 is a bottom plan view with parts broken away of the embodiment of FIG. 10.
Figure 10B:
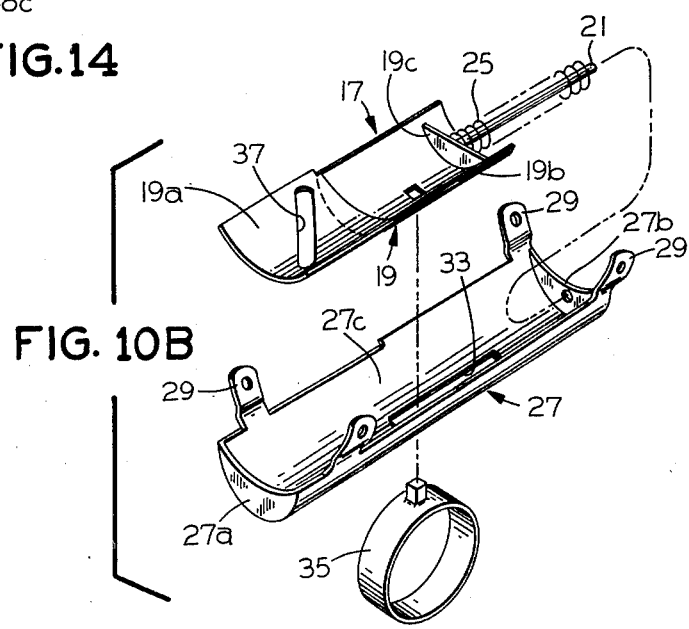
FIG. 10B is an exploded view of the trigger assembly of the seed dispenser of FIG. 10.

Referring now to FIGS. 10, 10B and 11, a trigger assembly 17 comprises a slide 19 having a slide tongue 19a and an end wall 19c in which an operating rod 21 is affixed. Resilient means comprising a compression spring 25 are disposed about rod 21 and mounted therein. A slide housing 27 is of approximately semi-cylindrical construction and is provided with mounting tabs 29 which are adapted to be secured by any suitable means, such as threaded fasteners 31, to the body of receptacle 12'.

As best seen in FIGS. 10B and 11, slide housing 27 has a longitudinally extending slot 33 therein and an inner surface 27c which is dimensioned and configured to slidably receive bearing portion 19b of slide 19. Slide housing 27 is longitudinally longer than slide assembly 17 so that slide 19 may be reciprocated longitudinally back and forth within slide housing 27 as described hereinbelow. Slide housing 27 has opposite end walls 27a and 27b and end wall 27b has an aperture (unnumbered) formed therein which is adapted to receive operating rod 21 therein for sliding movement therethrough.

Coil spring 25 is secured upon operating rod 21 between end wall 19c of slide 19 and end wall 27b of slide housing 27. As seen in FIG. 10, the distal end of rod 21 extends through an aperture (unnumbered) in pistol grip handle 13 which is hollow to allow rod 21 to reciprocate therein. A ring trigger 35 is connected to the underside of slide 19 by means of a stub connector (unnumbered) which passes through slot 33 in slide housing 27.

Tongue 19a of slide 19 has a diagonally disposed slot 27 formed therein which is adapted to slidably receive therein an end of pivot arm 23, as best seen with reference to FIG. 11.

The body of receptacle 12' has a slot 12a formed therein which extends circumferentially about a segment of the circumference of cylindrical receptacle 12'.

Slide assembly 17 is mounted within slide housing 27 and the latter is secured to receptacle 12' by fastening means 31 or the like. Pivot Arm 23 extends outwardly of slot 12a in receptacle 12' and its outermost end engages diagonal slot 37 in tongue 19a of slide assembly 17. With the seed spreader of FIG. 10 gripped in the manner of a pistol, ring trigger 35 may be pulled backwards against the resistance provided by resilient coil spring 25 and this causes tongue 19a to be moved rearwardly (rightwardly in the direction shown in FIGS. 10 and 11) thereby moving pivot arm 23 from the position shown in solid line in FIG. 11 to its position shown in dotted outline in FIG. 11. This movement of pivot arm 23 rotates, or more precisely, pivotably oscillates, Shaft 22' about its axis of rotation thereby moving closure plate 28' relative to the discharge opening formed by the alignment of outlet opening 42' with a selected one of control opening 48', 48a', 48b' or 48c' for intermittent opening and closing of the discharge opening. This cooperates with the movement of agitator blade 20' for intermittent discharge of the seeds or the like from receptacle 12' through the discharge opening and guide 30'. Coil spring 25 tends to return ring trigger 35 to its rest or forward position (leftwardly, as viewed in FIGS. 10 and 11). Therefore, trigger ring 35 may be repeatedly operated by pulling it backwards and permitting it to spring forward under the influence of coil spring 25.

The seed dispenser of the invention may be made from any appropriate material including metals, metal alloys, plastic (synthetic organic polymeric material) and even in part, or completely, of heavy cardboard or a combination of cardboard and plastic parts. Dispenser guide 30 may be connected to closure plate 26 by a snap fit within the ring provided by gripping rim 28. Alternatively, it may be permanently affixed in place by means of a suitable adhesive or any other suitable fastening means. Similarly, the baffle providing interior wall means 62 may be made to snap fit within receptacle 12 so as to be adapted for removal therefrom, or may be permanently affixed thereto by means of adhesive or the like. Obviously, if desired, interior wall means 62 could be integrally molded with receptacle 12.

It will be apparent that, upon a reading and understanding of the foregoing disclosure, numerous modifications and alterations to the preferred embodiment illustrated will occur to those skilled in the art, which modifications and alterations are nonetheless within the spirit of the described invention. It is intended to include such modifications within the scope of the appended claims.

What is claimed is:

1. A hand held dispenser for seeds or the like comprising:
   (a) a receptacle adapted to contain seeds or the like therein, and having a bottom wall;
   (b) a selector plate disposed in close proximity to said bottom wall, one of said selector plate and receptacle bottom wall having an outlet opening and the other of said selector plate and receptacle bottom wall having a plurality of spaced apart, differently configured control openings formed therein;
   (c) selector mounting means mounting said selector plate to extend along and be movable relative to said bottom wall to permit selective alignment of any one of said control openings with said outlet opening to provide a discharge opening extending from within said receptacle to exteriorly thereof;
   (d) an agitator blade within said receptacle;
   (e) blade mounting means mounting said agitator blade for periodic movement within said receptacle adjacent said bottom wall;
   (f) a closure plate having a dispenser opening therein and extending exteriorly of said bottom wall to close said discharge opening; and
   (g) closure mounting means mounting said closure plate to be movable relative to said discharge opening to permit selective movement of said closure plate dispenser opening into and out of register with said discharge opening for intermittent opening and closing thereof, whereby to cooperate with movement of said agitator blade for intermittent discharge of seeds or the like from said receptacle through said discharge opening.

2. The dispenser of claim 1 wherein said outlet opening is formed in said bottom wall and said control openings are formed in said selector plate, and said selector plate is mounted exteriorly of said receptacle.

3. The dispenser of claim 2 wherein said blade mounting means and said closure mounting means comprise connector means interconnecting said agitator blade and said closure plate for simultaneous movement thereof.

4. The dispenser of claim 3 wherein said connector means comprises a shaft extending through said bottom wall and mounting said agitator blade and said closure plate for simultaneous pivoting movement about said shaft relative to said receptacle.

5. The dispenser of claim 4 wherein said blade and said dispenser opening are mounted on said shaft in radial alignment with each other relative to said shaft whereby said blade and said dispenser opening are simultaneously moved into and out of register with said discharge opening.

6. The dispenser of claim 4 wherein said closure plate has a flange portion adapted to be gripped for manual movement of said closure plate and agitator blade relative to said receptacle.

7. The dispenser of claim 4 wherein said dispenser further includes trigger means thereon accessible externally thereof and operatively connected to said agitator blade for movement of said closure plate and agitator blade relative to said receptacle by operation of said trigger means.

8. The dispenser of claim 4 wherein said selector plate is mounted for pivoting movement relative to said receptacle and includes first detent means thereon, said bottom wall includes second detent means on the exterior thereof adapted to releasably engage said first detent means to position said selector plate in a selected one of pivot positions relative to said receptacle bottom wall to provide said selective alignment of any one of said control openings with said outlet opening.

9. The dispenser of claim 8 wherein said selector plate includes handle means projecting generally radially outwardly therefrom for pivoting said selector plate.

10. The dispenser of claim 9 wherein indicia are provided on the exterior of said receptacle and said handle means serve as pointer means cooperating with said indicia to indicate the relative pivot position of said selector plate to said receptacle bottom wall.

11. The dispenser of claim 8 further including a pair of stops on said dispenser spaced apart circumferentially relative to said pivoting movement of said closure plate, and a dog on said closure plate adapted to be moved into engagement with said stops by said pivoting movement to limit sand pivoting movement.

12. The dispenser of claim 8 further including thereon a pistol grip handle and trigger means, said pistol grip extending outwardly of said receptacle and said trigger means being accessible externally of said receptacle and disposed adjacent to said pistol grip, said trigger means being operatively connected to said agitator blade for simultaneous movement of said closure plate and agitator blade relative to said receptacle by operation of said trigger means.

13. A hand held dispenser for seeds or the like comprising:
   (a) a receptacle adapted to contain seeds or the like therein, and having a bottom wall in which an outlet opening is formed;
   (b) a generally disc shaped selector plate disposed exteriorly of and in sliding contact with said bottom wall and having a plurality of circumferentially spaced apart, differently configured control openings formed therein;
   (c) selector mounting means mounting said selector plate to extend along the exterior of said bottom wall and be movable relative thereto to permit selective alignment of any one of said control openings with said outlet opening to provide a discharge opening extending from within said receptacle to exteriorly thereof;
   (d) an agitator blade within said receptacle;
   (e) a generally disc shaped closure plate having a dispenser opening therein and extending exteriorly of said bottom wall to close said discharge opening; and
   (f) a shaft extending through said bottom wall and mounting said agitator blade and said closure plate for simultaneous pivoting movement thereof relative to both said bottom wall and said selector plate to permit (1) periodic traversing of said discharge opening by said agitator blade and (2) periodic registering of said dispenser opening with said discharge opening for intermittent opening and closing thereof, whereby said agitator blade and said closure plate cooperate for intermittent discharge of seeds or the like from said receptacle through said discharge opening.

14. The dispenser of claim 13 further including a pair of stop means on said receptacle spaced apart circumferentially relative to movement of said closure plate and on opposite circumferential sides of said dispenser opening, and a dog projecting from said closure plate and adapted to be moved into contact with said stop means by said pivoting movement of said closure plate to limit said pivoting movement between said stop means.

15. The dispenser of claim 13 further including a dispenser guide depending from said closure plate and having the form of a truncated hollow cone with its base adjacent said closure plate, said guide being adapted to guide the seeds or the like discharged from said receptacle.

16. The dispenser of claim 15 wherein said receptacle is generally cylindrical in shape and said bottom wall is generally disc shaped.

17. The dispenser of claim 15 further including interior wall means within said receptacle sloping inwardly towards said bottom wall to direct seeds or the like to said outlet opening.

18. The dispenser of claim 15 wherein said selector plate is affixed at its periphery to said dispenser guide and said selector plate is movably mounted on said receptacle adjacent said bottom wall thereof to mount said selector plate to extend along the exterior of said bottom wall and be movable relative thereto.

19. The dispenser of claim 18 wherein said receptacle is generally cylindrical in shape, said bottom wall is generally disc shaped, said agitator blade has a pivot arm portion and further including a pistol grip handle extending transversely outwardly of said receptacle, and trigger means on said receptacle outer wall adjacent said pistol grip, said trigger means being operatively connected to said pivot arm of said agitator blade for simultaneous movement of said closure plate and agitator blade relative to said receptacle by operation of said trigger means.

* * * * *